US008225926B1

(12) United States Patent
Anderson et al.

(10) Patent No.: US 8,225,926 B1
(45) Date of Patent: Jul. 24, 2012

(54) TROUGHING SIDE IDLER FOR BELT CONVEYORS

(75) Inventors: Terry L. Anderson, Minden, IA (US); Paul J. Ridder, Omaha, NE (US); Theodore L. Sondgeroth, Omaha, NE (US)

(73) Assignee: Enduro Systems, Inc., Omaha, NE (US)

( * ) Notice: Subject to any disclaimer, the term of this patent is extended or adjusted under 35 U.S.C. 154(b) by 1 day.

(21) Appl. No.: 12/932,180

(22) Filed: Feb. 18, 2011

(51) Int. Cl.
*B65G 15/08* (2006.01)
(52) U.S. Cl. .................................. 198/829; 198/828
(58) Field of Classification Search ............... 198/824, 198/826, 828, 829
See application file for complete search history.

(56) References Cited

U.S. PATENT DOCUMENTS

| | | | | |
|---|---|---|---|---|
| 1,088,644 A | * | 2/1914 | Willson, Jr. .................. | 198/829 |
| 3,809,211 A | * | 5/1974 | Padilla .......................... | 198/825 |
| 4,245,738 A | * | 1/1981 | Butcher et al. ................ | 198/829 |
| 4,266,662 A | * | 5/1981 | Reid .............................. | 198/829 |
| 4,844,241 A | * | 7/1989 | Woodward .................... | 198/829 |
| 6,044,965 A | | 4/2000 | Clark | |
| 6,634,490 B2 | * | 10/2003 | Fischer et al. ................ | 198/826 |
| 8,025,145 B2 | * | 9/2011 | Keys ............................. | 198/824 |

* cited by examiner

*Primary Examiner* — James R Bidwell
(74) *Attorney, Agent, or Firm* — Dennis L. Thomte; Thomte Patent Law Office LLC (57) ABSTRACT

A troughing side idler for use with a belt conveyor having upstanding first and second side walls. A first troughing side idler is secured to the first side wall and a second troughing side idler is secured to the second side wall. A horizontally extending medial roller extends between the first and second side walls for cooperation with the side idlers to shape the conveyor belt into a trough. Each of the side idlers includes an idler roller having a shaft which extends upwardly and outwardly through inner and outer bearings which are secured to a bearing bracket housing which is operatively secured to the associated side wall. The upper outer end of the shaft has an annular groove formed therein. A set screw extends through the inner ring of the outer bearing and extends into the annular groove in the shaft. A set screw extends through the inner ring of the inner bearing for frictional engagement with the shaft. A fender washer is secured to the outer end of the shaft.

10 Claims, 9 Drawing Sheets

TROUGHING SIDE IDLER FOR BELT CONVEYORS

BACKGROUND OF THE INVENTION

1. Field of the Invention

This invention relates to a belt conveyor and more particularly to a troughing side idler for use with a belt conveyor.

2. Description of the Related Art

Enclosed belt conveyors are commonly used to convey particulate material such as grain or the like. In an effort to maintain the material on the conveyor belt, spool-like troughing side idlers have been used to shape the conveyor belt into a trough-like configuration. See for example, assignee's prior U.S. Pat. No. 6,681,921 which issued on Jan. 27, 2004. Although the belt conveyor assembly of U.S. Pat. No. 6,681,921 functions extremely well, it has been found that the troughing side idlers thereof may cause slippage between the belt and the frusto-conical side surface of the troughing side idlers. Prior to the invention of the above-identified patent, U.S. Pat. No. 6,044,965 issued on Apr. 4, 2000. In U.S. Pat. No. 6,044,965, angularly disposed troughing side idlers work in combination with horizontally disposed medial rollers to shape the conveyor belt into a trough-like configuration. Although the troughing side idlers of U.S. Pat. No. 6,044,965 may function in a satisfactory manner, it is believed that the troughing side idlers thereof are difficult to install, difficult to maintain and are difficult to repair.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A troughing side idler assembly is disclosed which is designed for use with a belt conveyor, having a tail end and a head end, and which includes a plurality of conveyor housing sections secured together in an end-to-end relationship. Each of the conveyor housing sections has spaced-apart side walls, a bottom wall and an open upper end which is selectively closed by a cover or lid. In the preferred embodiment, each of the side walls of the housing section at the tail end of the conveyor has three upstanding and horizontally spaced-apart bearing brackets secured to the outside surfaces thereof. The other housing sections have at least one, and preferably two bearing brackets secured to the outside surface of each of the side walls thereof. In all cases, the upper ends of the bearing brackets have an opening formed therein which communicates with an opening formed in the respective side wall of the housing section. In all cases, the bearing brackets have outwardly extending flanges at the side edges thereof.

An angularly disposed bearing bracket housing is secured to the upper end of the bearing bracket and extends upwardly and outwardly therefrom in a transverse manner. The bearing bracket housing includes a top wall, a first side wall, a second side wall, an inner end wall or plate, an outer end wall or plate, each of which has a central opening formed therein.

The assembly also includes an outer flange bearing including a frame and a rotatable inner ring which has a lower exposed end portion which extends from the frame of the outer flange bearing. The frame of the outer flange bearing is secured to the outer end wall of the bearing bracket housing at the inner surface thereof so that the inner ring of the outer flange bearing is in alignment with the central opening in the outer end wall of the bearing bracket housing. The lower exposed end portion of the inner ring of the outer flange bearing has at least one tapped bore extending therethrough which is adapted to threadably receive a set screw therein.

The assembly also includes an inner flange bearing including a frame and a rotatable inner ring which has an upper exposed end portion which extends from the frame of the inner flange bearing. The frame of the inner flange bearing is secured to the lower end wall of the bearing bracket housing at the inner surface thereof so that the inner ring of the inner flange bearing is in alignment with the central opening in the lower end wall of the bearing bracket housing. The upper exposed end portion of the inner ring of the inner flange bearing has at least one tapped bore extending therethrough which is adapted to threadably receive a set screw therein.

The assembly further includes an idler including a cylindrical body portion having upper and lower ends with a shaft, having outer and inner ends, secured thereto which extends therefrom. The shaft has an annular groove formed therein adjacent the outer end thereof. The shaft of the idler extends upwardly and outwardly through the inner ring of the inner flange bearing and extends through the inner ring of the outer flange bearing. A first set screw, having inner and outer ends, threadably extends through the tapped opening in the lower exposed end portion of the inner ring of the outer flange bearing with the inner end of the first set screw being received by the annular groove in the shaft of the idler. A second set screw, having inner and outer ends, extends through the tapped opening in the upper exposed end portion of the inner ring of the inner flange bearing with the inner end of the second set screw frictionally engaging the shaft of the idler. A cover is selectively removably secured to the bearing bracket housing to enclose the outer end and bottom thereof.

It is therefore a principal object to provide an improved troughing side idler for a belt conveyor.

A further object of the invention is to provide an improved troughing side idler for a belt conveyor which is easy to install, easy to maintain and easy to repair.

A further object of the invention is to provide a troughing side idler which is securely mounted on a side wall of a belt conveyor.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Embodiments are described more fully below with reference to the accompanying FIGURES, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

Figure 1:
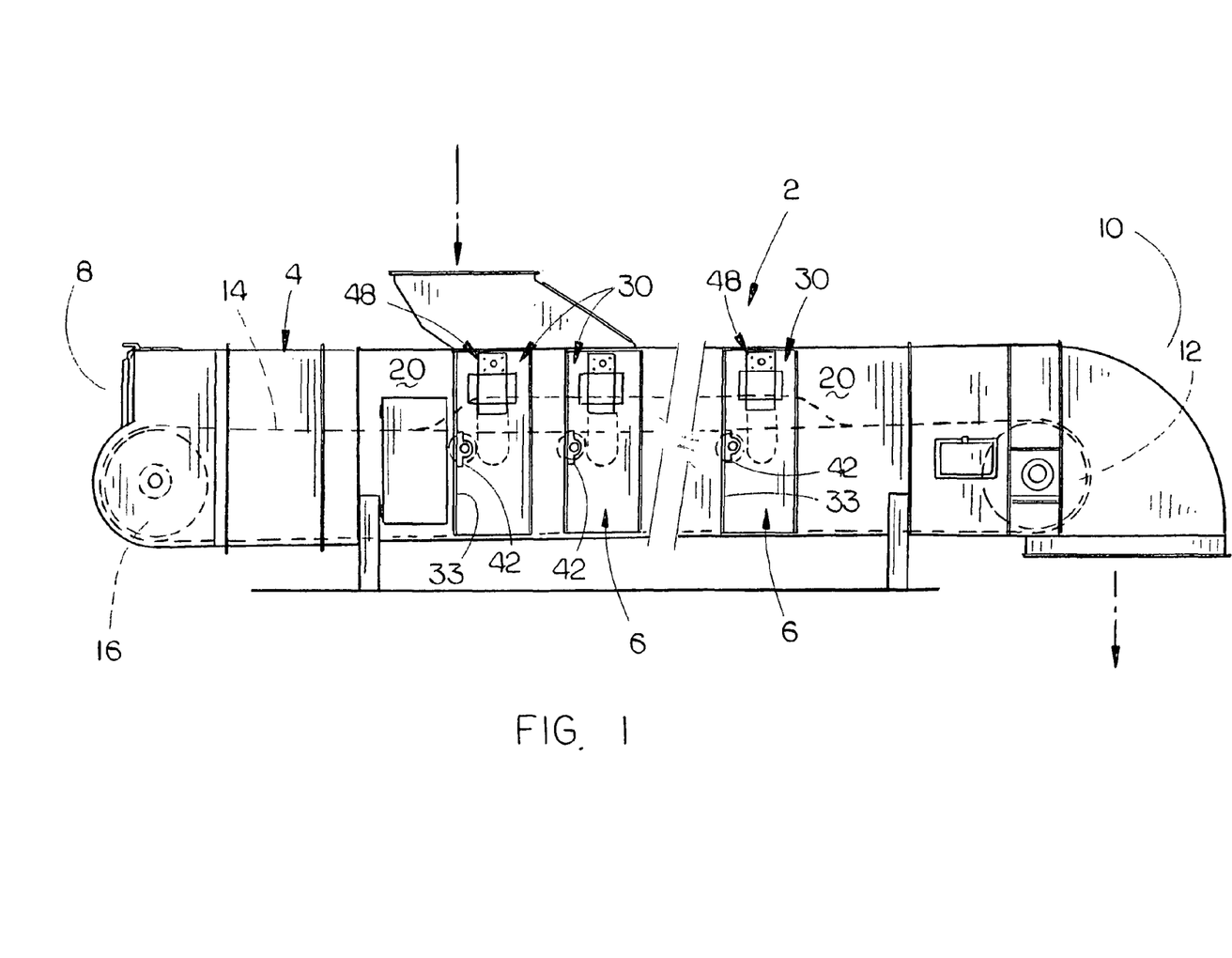
FIG. 1 is a partial side view of a belt conveyor having the troughing side idlers of the invention mounted thereon.

The numeral 2 refers to an enclosed belt conveyor including an elongated housing 4 which is comprised of a plurality of conveyor body or housing sections 6 bolted together in an end-to-end manner. Conveyor 2 includes a tail end 8 and a head end 10. A conventional drive motor drives a head roller 12 which drives the conveyor belt 14. Conveyor 2 also includes a conventional tail roller 16 at the tail end 8.

Figure 2:
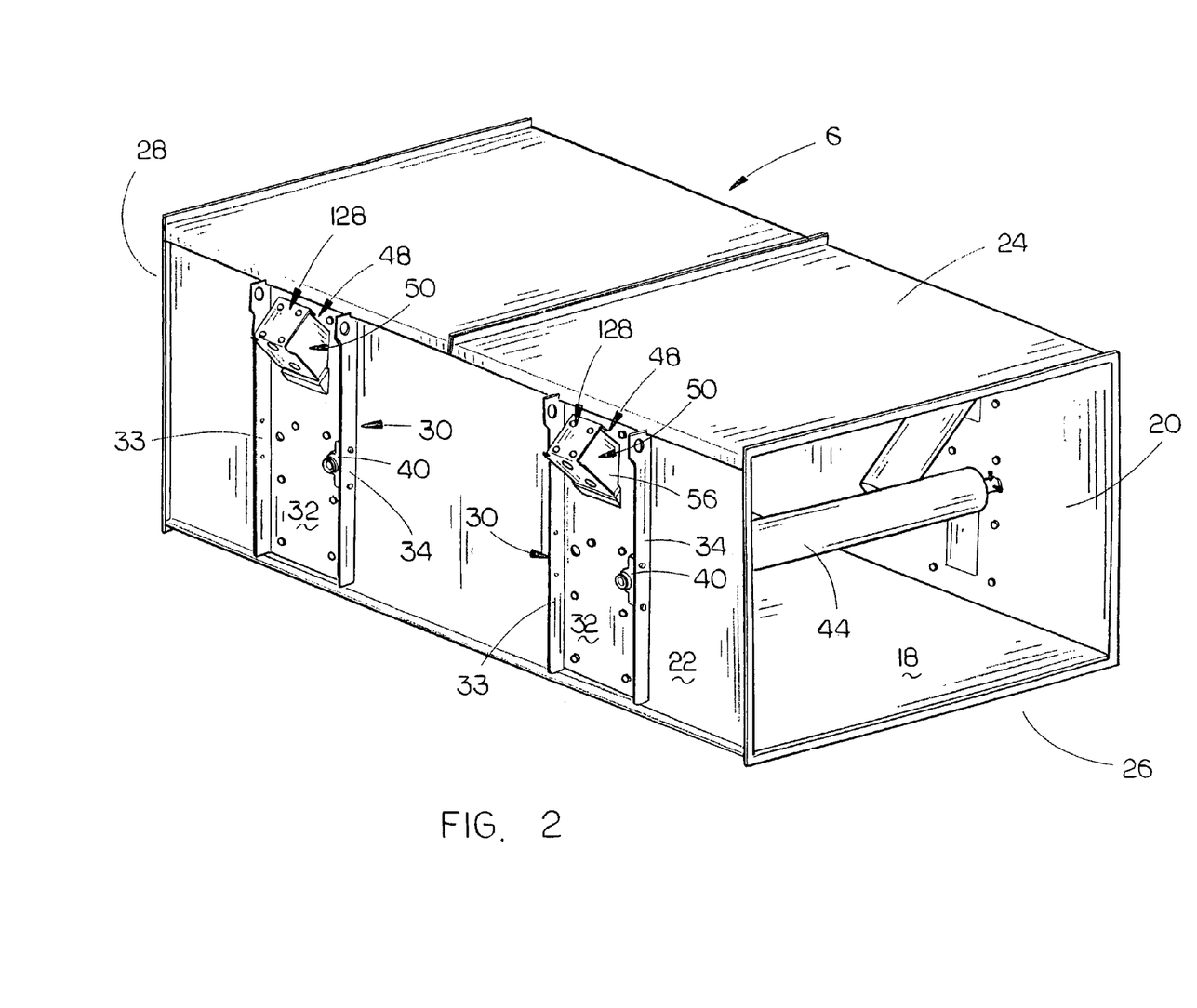
FIG. 2 is a perspective view of one of the conveyor housing sections.
Figure 3:
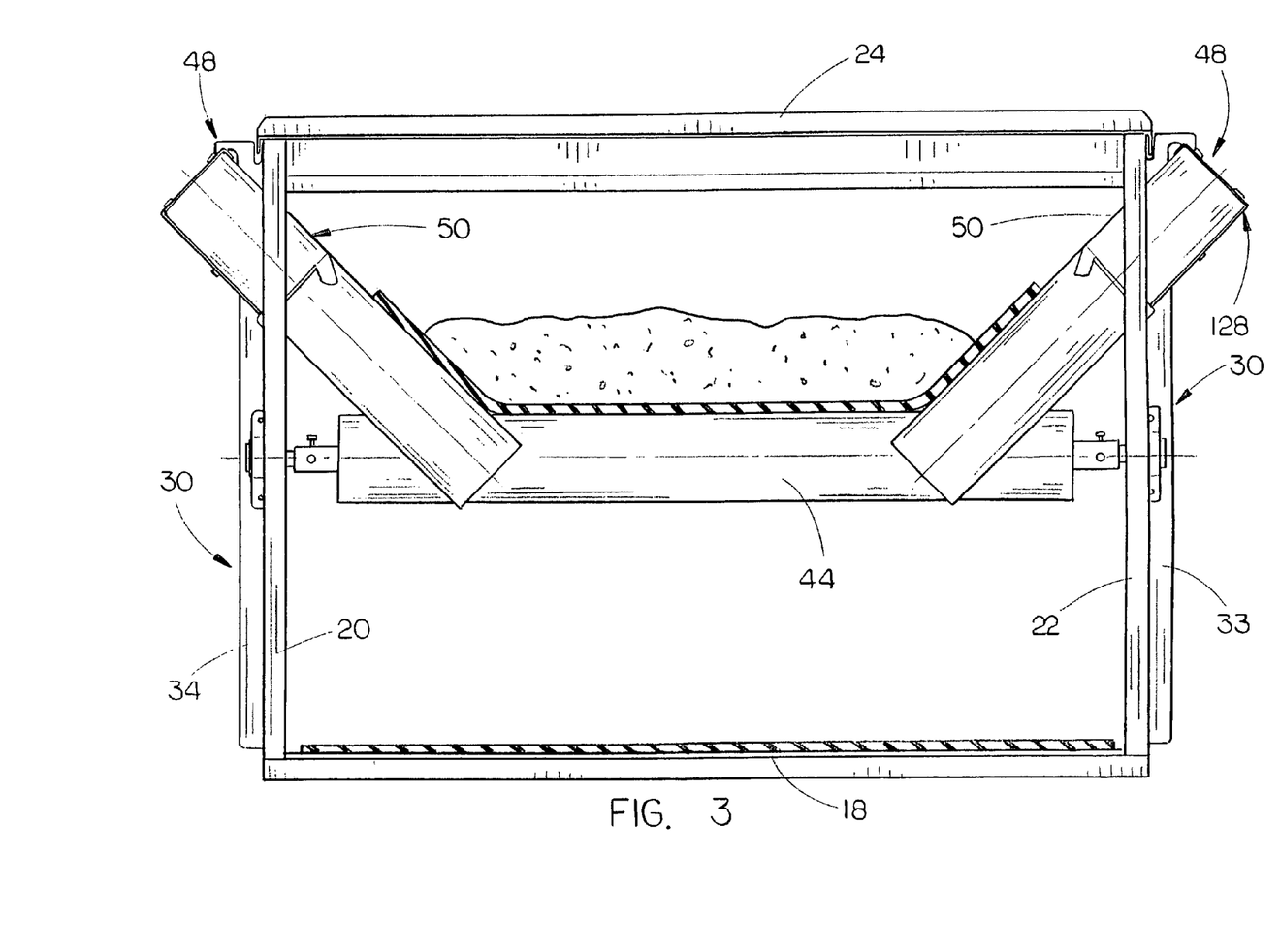
FIG. 3 is an end view of the conveyor housing section of FIG. 2 as seen from the left end thereof and which illustrates the conveyor belt in cross-section.
Figure 4:
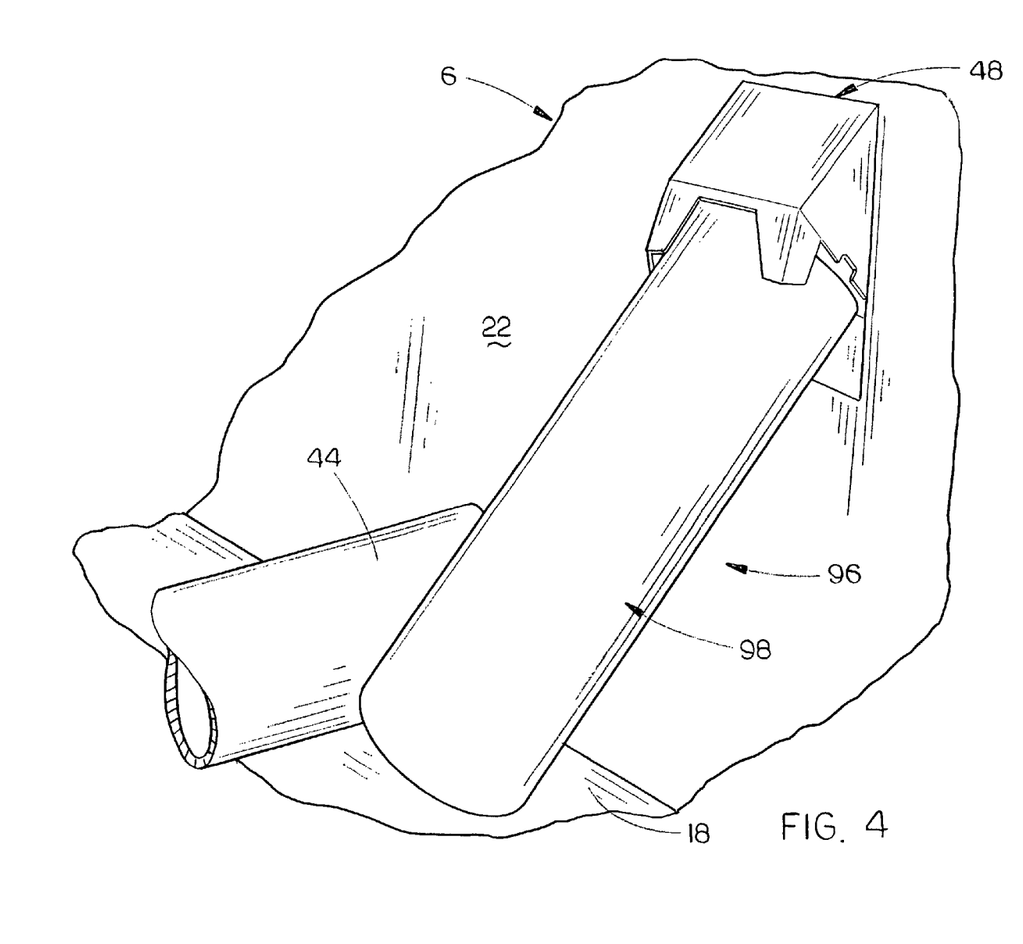
FIG. 4 is a partial perspective view of the conveyor housing section of FIG. 2 as seen from the left end thereof.

Inasmuch as each of the conveyor housing sections 6 are identical, only a single conveyor housing section will be described in detail. Housing section 6 includes a bottom wall 18, opposite side walls 20 and 22, and an open upper end which is selectively closed by a cover or lid 24. Housing section 14 will also be described as having a first end 26 and a second end 28.

The numeral 30 refers to upstanding bearing brackets which are bolted to the exterior sides of side wall 20 and side wall 22. It is preferred that three of the bearing brackets 30 be secured to each of the side walls 20 and 22 of the housing section 6 which is positioned at the tail end 8 of the conveyor 2 in a horizontally spaced-apart manner for impact purposes. In other words, the material to be conveyed is dumped into the conveyor 2 adjacent the tail end 8 thereof and which may require additional troughing side idlers and horizontally disposed medial idlers to resist the impact of the particulate material being delivered to the conveyor 2.

Figure 5:
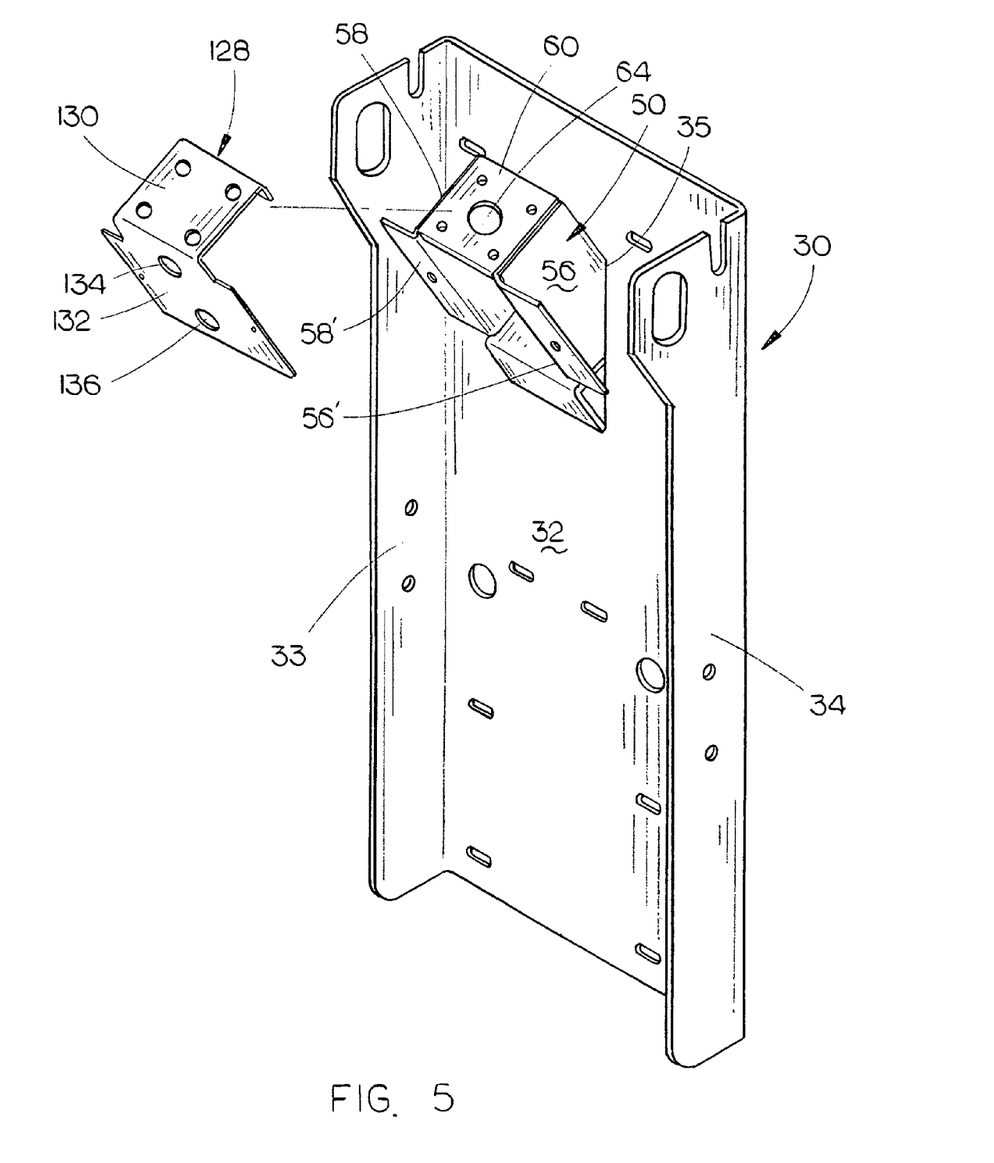
FIG. 5 is an exploded perspective view of the bearing bracket of this invention with the bearing bracket housing welded thereto and with the cover therefore shown in an exploded form.

It is preferred that two of the bearing brackets 30 be secured to each of the side walls 20 and 22 of the other housing sections 6 in a horizontally spaced-apart manner. The number of bearing brackets 30 secured to each side wall of the section 6 will also depend upon the length of the section 6. Bearing bracket 30 includes a base portion 32 and side flanges 33 and 34. An opening 35 is provided in the bearing bracket 30 at the upper end thereof.

In the embodiment shown in FIG. 2, a bearing 40 is secured to each of the flanges 34 of the two bearing brackets 30 positioned at side wall 22. A bearing 42 is secured to each of the flanges 33 of the two bearing brackets 30 positioned at side wall 20. Horizontally disposed and horizontally spaced-apart medial idler rollers 44 have their ends rotatably supported by bearings 40 and 42.

A pair of horizontally spaced-apart angularly disposed troughing side idler assemblies 48 are mounted on the bearing brackets 30 at side 20 and a pair of horizontally spaced-apart angularly disposed troughing side idler assemblies 48 are mounted on side wall 22. Inasmuch as each of the troughing side idler assemblies 48 are identical, only a single troughing side idler assembly 48 will be described in detail.

Assembly 48 includes an angularly disposed bearing bracket housing 50 which is secured to bearing bracket 30 by welding or the like. Bearing bracket housing 50 includes an inclined upper wall 54, side walls 56 and 58, an outer plate or end wall 60 and an inner plate or end wall 62. Plate 60 has a central opening 64 formed therein and plate 62 has a central opening 66 formed therein. Flanges 56' and 58' extend transversely from side walls 56 and 58 respectively.

Figure 7:
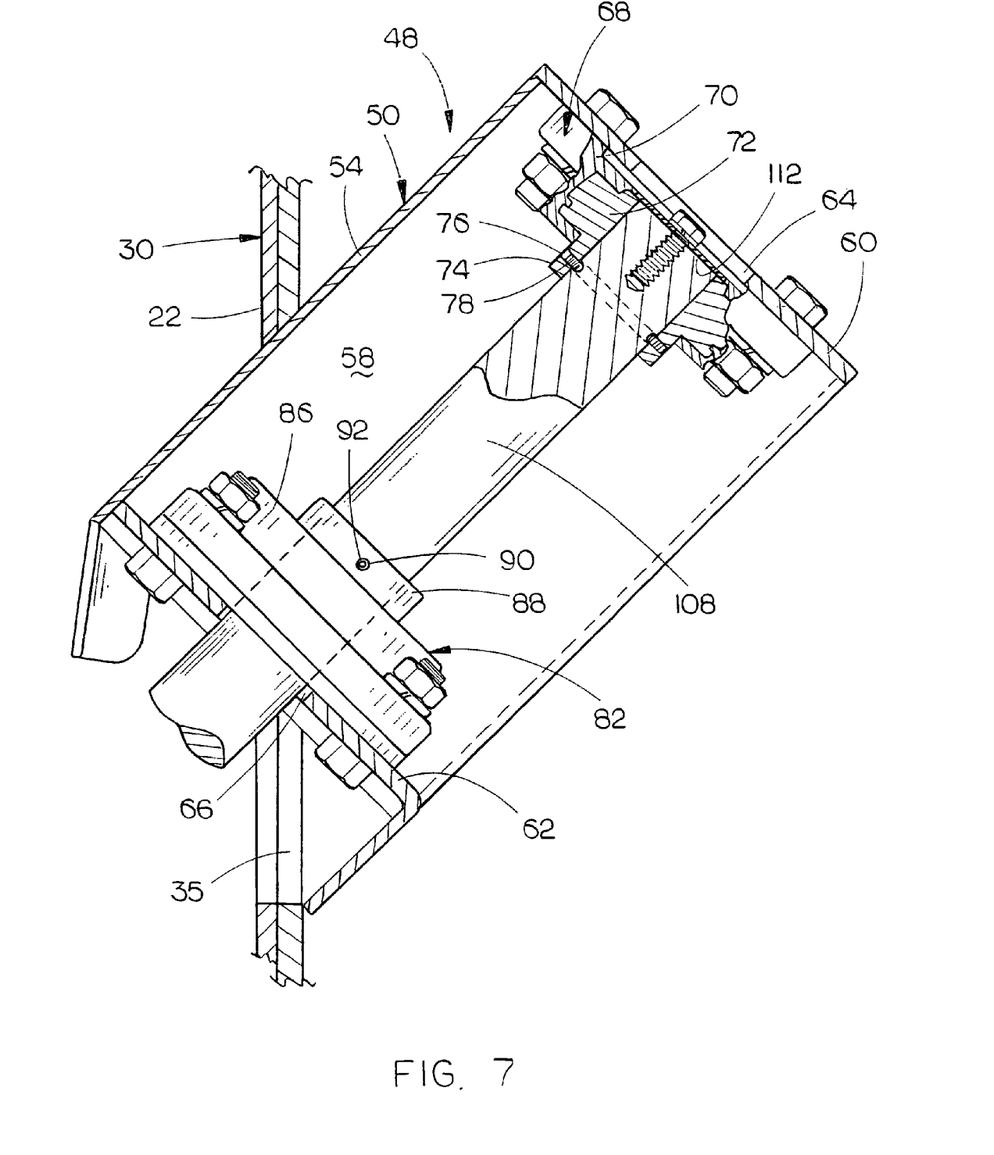
FIG. 7 is a partial sectional view of the troughing side idler of this invention.
Figure 8:
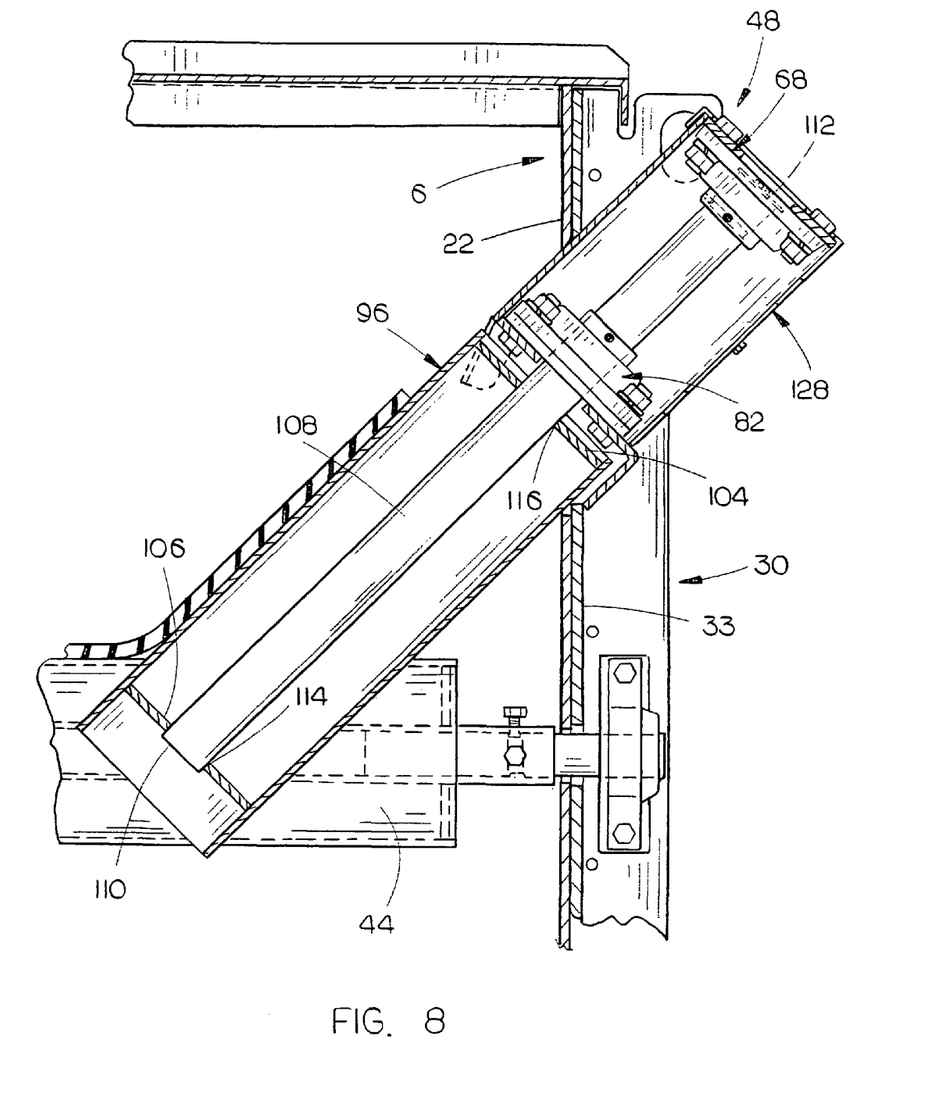
FIG. 8 is a partial sectional view of the troughing side idler of this invention which illustrates its relationship to the conveyor housing section, medial idler and conveyor belt.
Figure 9:
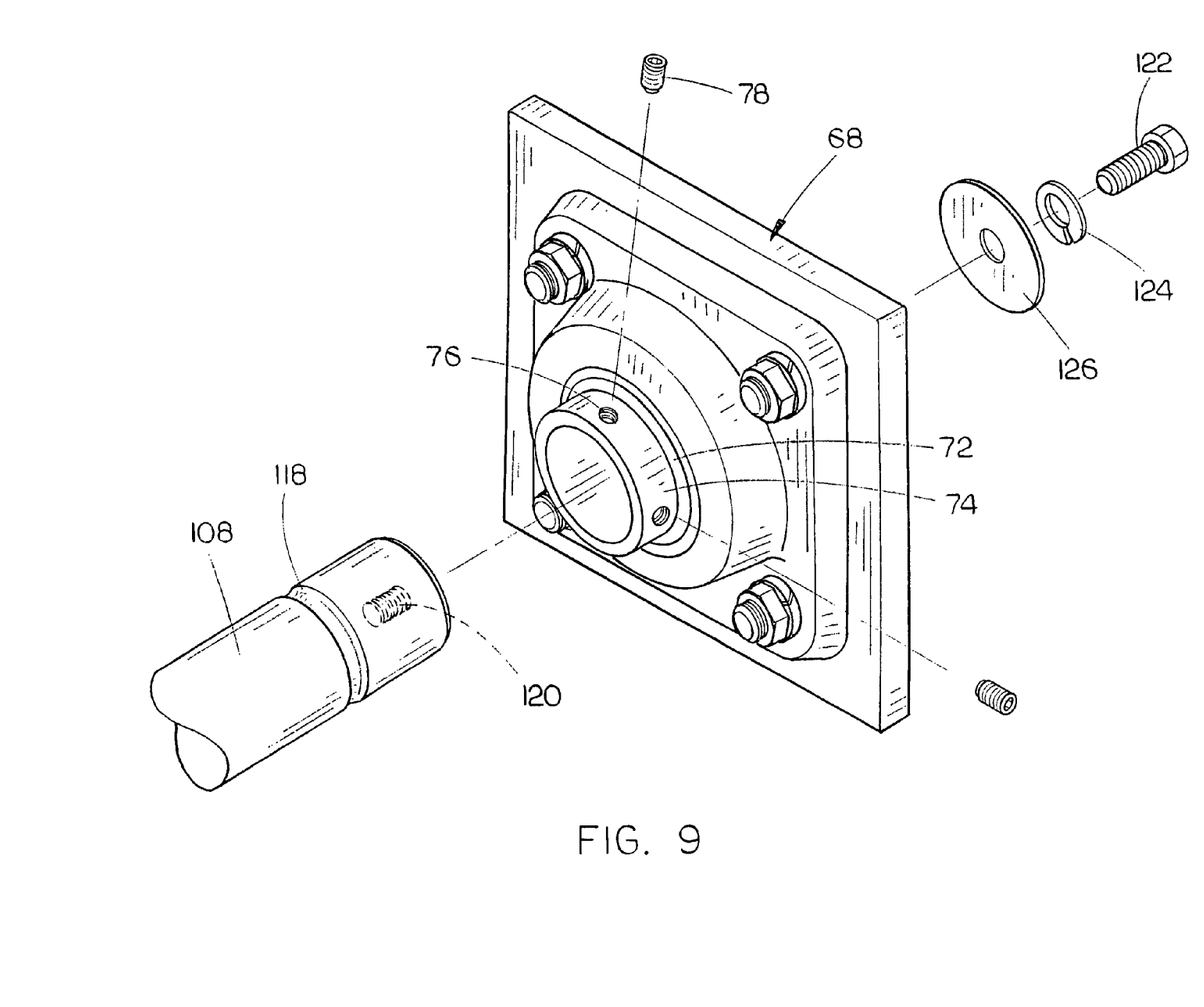
FIG. 9 is a partial exploded perspective view of the upper end of the side idler and the outer flange bearing in which the shaft of the idler is received.

The numeral 68 refers to an outer flange bearing which is secured to outer plate 60 by bolts or the like and which includes a frame or housing 70 and an inner ring 72 which is rotatably mounted in frame 70. As seen, inner ring 72 has an exposed lower end portion 74 which protrudes from frame 70. The exposed lower end portion 74 has one or more tapped bores 76 extending therethrough which are adapted to threadably receive set screw 78 therein as will be described in more detail hereinafter. Bearing 68 includes a grease fitting or zerk 80 to enable the bearing 68 to be greased.

The numeral 82 refers to an inner flange bearing including a frame or housing 84 and an inner ring 86 which has an exposed upper end portion 88 which protrudes from frame 84. The exposed upper end portion 88 has one or more tapped bores 90 extending therethrough, each of which are adapted to threadably receive a set screw 92 therein as will be described in more detail hereinafter. Bearing 82 includes a grease fitting 94 or zerk to enable the bearing 82 to be greased.

Figure 6:
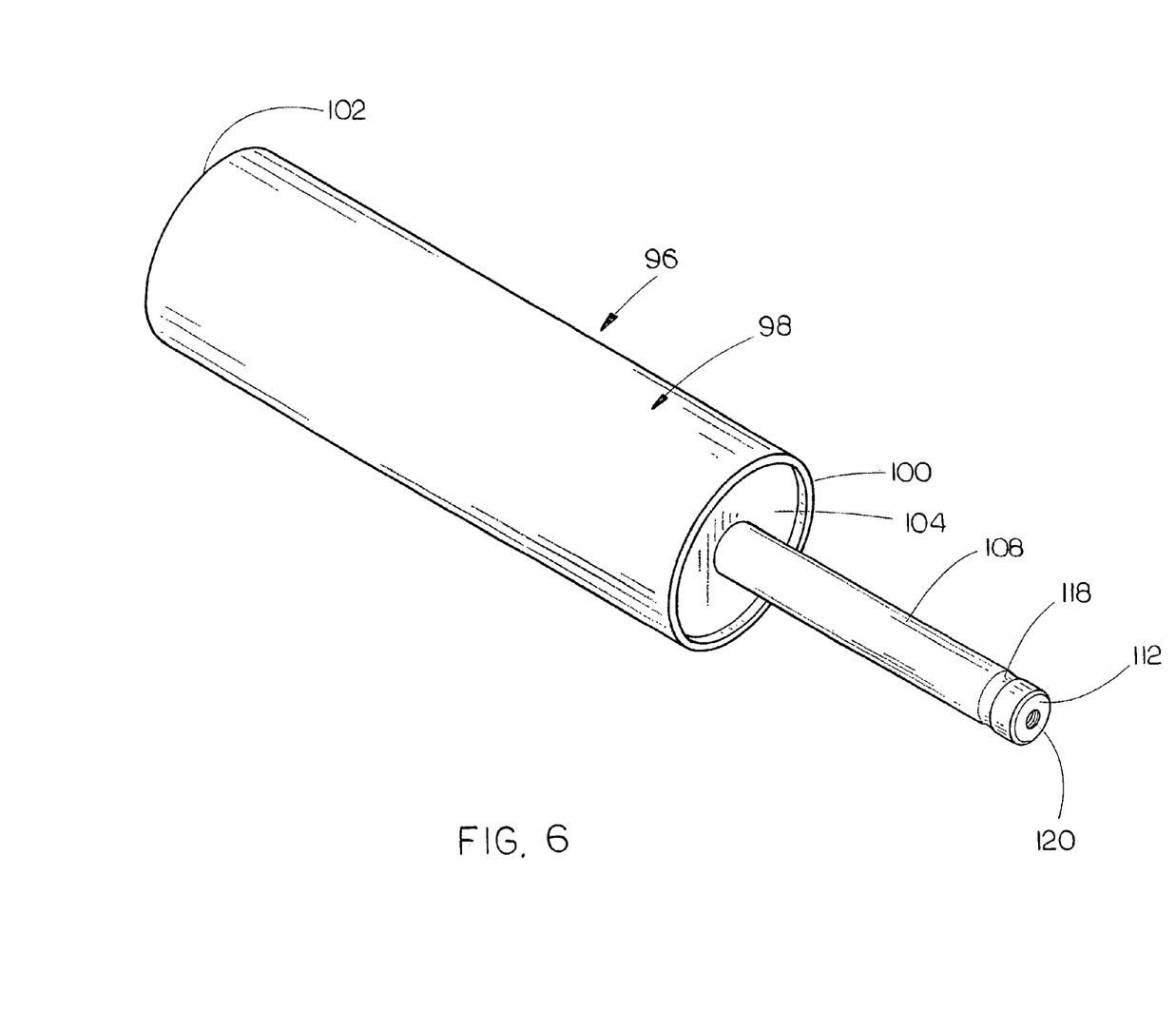
FIG. 6 is a perspective view of the troughing side idler of this invention.

Side idler assembly 48 also includes a side idler roller 96 having a hollow cylindrical body or tube 98 with an upper end 100 and a lower end 102. Plate 104 is welded to the upper end of body 98 and plate 106 is welded to the lower end of body 98. The side idler assembly 48 also includes an elongated idler shaft 108 having a lower end 110 and an upper end 112. The lower end 110 of shaft 108 extends through a central opening 114 in plate 106 and is welded to plate 106. Shaft 108 extends through a central opening 116 in plate 104 and is welded to plate 104. An annular groove 118 is formed in shaft 108 below the upper end 112 thereof. A tapped bore 120 extends into the upper end of shaft 108 which is adapted to threadably receive a screw or bolt 122 therein as will be described in more detail hereinbelow.

As seen in FIG. 9, the numeral 124 refers to a lock washer and the numeral 126 refers to a fender washer. Fender washer 126 is secured to the upper end of shaft 108 after the shaft 108 has been positioned in inner ring 72 of flange bearing 68 by the bolt 122 and lock washer 126. Fender washer 126 has a diameter which is less than the diameter of central opening 64 of outer plate 60 and has a diameter which is greater than the inside diameter of inner ring 72 to further maintain shaft 108 in position.

The numeral 128 refers to a cover which is selectively secured to bearing bracket housing 50. Cover 128 includes an outer wall 130 and a bottom wall 132. When cover 128 is secured to bearing bracket housing 50, outer wall 130 extends over outer plate 60 and bottom wall 132 closes the underside of bearing bracket housing 50. Bottom wall 132 includes openings 134 and 136 formed therein which are aligned with grease fittings or zerks in outer bearing 68 and inner bearing 82 to enable the bearings to be greased without removing cover 128.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

We claim:
1. A belt conveyor, comprising:
an elongated conveyor housing comprised of a plurality of conveyor housing sections secured together in an end-to-end relationship;
each of said conveyor housing sections including upstanding first and second side walls positioned opposite each other in a spaced-apart relationship with respect to a space along which a conveyor belt moves along a belt path;
each of said first and second side walls of said conveyor housing sections having inner and outer surfaces;
a horizontally disposed idler roller positioned between said first and second side walls;
each of said first and second side walls having an opening formed therein in a plane which is above said horizontally disposed idler roller;
a first troughing side idler assembly secured to said first side wall;
said first troughing side idler assembly including a first angularly disposed bearing bracket housing operatively secured to said first side wall;
said first bearing bracket housing having an upper outer end and a lower inner end;
said inner end of said first bearing bracket housing being in communication with said opening formed in said first side wall of said conveyor housing section;
said upper outer end of said first bearing bracket housing having an upper plate secured thereto which has a central opening formed therein and which has inner and outer surfaces;
said lower inner end of said first bearing bracket housing having a lower plate secured thereto which has a central opening formed therein and which has inner and outer surfaces;
an outer bearing including a frame and a rotatable inner ring which has a lower exposed end portion which extends from said frame of said outer bearing;
said frame of said outer bearing being secured to said upper plate of said first bearing bracket housing at said inner surface thereof so that said inner ring of said outer bearing is in alignment with said central opening in said upper plate of said first bearing bracket housing;
said lower exposed end portion of said inner ring of said outer bearing having a tapped bore extending therethrough adapted to threadably receive a set screw therein;
an inner bearing including a frame and a rotatable inner ring which has an upper exposed end portion which extends from said frame of said inner bearing;
said frame of said inner bearing being secured to said lower plate of said first bearing bracket housing at said inner surface thereof so that said inner ring of said inner bearing is in alignment with said central opening in said lower plate of said first bearing bracket housing;
said upper exposed end portion of said inner ring of said inner bearing having a tapped bore extending therethrough adapted to threadably receive a set screw therein;
a first troughing side idler including a cylindrical body portion having upper and lower ends with a shaft secured thereto which extends upwardly therefrom;
said shaft having an outer end and an inner end;
said shaft having an annular groove formed therein adjacent said outer end thereof;
said shaft extending through said inner ring of said inner bearing and extending through said inner ring of said outer bearing;
a first set screw, having inner and outer ends, extending through said tapped bore in said lower exposed end portion of said inner ring of said outer bearing with said inner end thereof being received by said annular groove in said shaft;
a second set screw, having inner and outer ends, extending through said tapped bore in said upper exposed end portion of said inner ring of said inner bearing with said inner end of said second set screw frictionally engaging said shaft;
a second troughing side idler assembly secured to said second side wall;
said second troughing side idler assembly including a first angularly disposed bearing bracket housing operatively secured to said second side wall;
said first bearing bracket housing of said second troughing side idler assembly having an upper outer end and a lower inner end;
said inner end of said first bearing bracket housing of said second troughing side idler assembly being in communication with said opening formed in said second side wall;
said upper outer end of said first bearing bracket housing of said second troughing side idler assembly having an upper plate secured thereto which has a central opening formed therein and which has inner and outer surfaces;
said lower inner end of said first bearing bracket housing of said second troughing side idler assembly having a lower plate secured thereto which has a central opening formed therein and which has inner and outer surfaces;
said second troughing side idler assembly including an outer bearing including a housing and a rotatable inner ring which has a lower exposed end portion which extends from said frame of said outer bearing of said second troughing side idler assembly;
said frame of said outer bearing of said second troughing side idler assembly being secured to said upper plate of said first bearing bracket housing at said inner surface thereof so that said inner ring of said outer bearing is in alignment with said central opening in said upper plate of said first bearing bracket housing of said second troughing side idler assembly;
said lower exposed end portion of said inner ring of said outer bearing of said second troughing side idler assembly having a tapped bore extending therethrough adapted to threadably receive a set screw therein;
said second troughing side idler assembly including an inner bearing including a frame and a rotatable inner ring which has an upper exposed end portion which extends from said frame of said inner bearing of said second troughing side idler assembly;
said frame of said inner bearing of said second troughing side idler assembly being secured to said lower plate of said first bearing bracket housing of said second troughing side idler assembly at said inner surface thereof so that said inner ring of said inner bearing is in alignment with said central opening in said lower plate of said first bearing bracket housing of said second troughing side idler assembly;
said upper exposed end portion of said inner ring of said inner bearing of said second troughing side idler assem- bly having a tapped bore extending therethrough adapted to threadably receive a set screw therein;

a second troughing idler roller including a cylindrical body portion having upper and lower ends with a shaft secured thereto which extends therefrom;

said shaft of said second troughing idler roller having an outer end and an inner end;

said shaft of said second troughing idler roller having an annular groove formed therein adjacent said outer end thereof;

said shaft of said second troughing idler roller extending through said inner ring of said inner bearing and extending through said inner ring of said outer bearing of said second troughing side idler assembly;

a first set screw, having inner and outer ends, threadably extending through said tapped bore in said lower exposed end portion of said inner ring of said outer bearing of said second troughing side idler assembly with said inner end thereof being received by said annular groove in said shaft;

a second set screw, having inner and outer ends, extending through said tapped bore in said upper exposed end portion of said inner ring of said inner bearing of said second troughing side idler assembly with said inner end of said second set screw frictionally engaging said shaft.

2. The structure of claim 1 wherein said inner and outer bearings are flange bearings.

3. The structure of claim 1 wherein said shaft of each of said first and second troughing side idler assemblies has a tapped bore extending into said upper end thereof and wherein a fender washer is positioned on said upper end of said shaft and wherein a bolt extends through said fender washer into said tapped bore in said shaft, said fender washer having a diameter which is greater than the diameter of said inner ring of said upper bearing, said fender washer having a diameter which is less than the diameter of said central opening of said upper plate of said bearing bracket housing.

4. The structure of claim 1 wherein a cover is selectively removably secured to each of said bearing bracket housings.

5. The structure of claim 1 wherein a bearing bracket is secured to each of said side walls of said housing sections and wherein said bracket bearing housings are secured to said bearing brackets.

6. A troughing side idler for a belt conveyor having an upstanding side wall with the side wall having an opening formed therein, comprising:

a first troughing side idler assembly operatively secured to said side wall;

said first troughing side idler assembly including an angularly disposed bearing bracket housing operatively secured to said side wall;

said bearing bracket housing having an upper outer end and a lower inner end;

said inner end of said first bearing bracket housing being in communication with said opening formed in said first side wall;

said upper outer end of said first bearing bracket housing having an upper plate secured thereto which has a central opening formed therein and which has inner and outer surfaces;

said lower inner end of said first bearing bracket housing having a lower plate secured thereto which has a central opening formed therein and which has inner and outer surfaces;

an outer bearing including a frame and a rotatable inner ring which has a lower exposed end portion which extends from said frame of said outer bearing;

said frame of said outer bearing being secured to said upper plate of said first bearing bracket housing at said inner surface thereof so that said inner ring of said outer bearing is in alignment with said central opening in said upper plate of said first bearing bracket housing;

said lower exposed end portion of said inner ring of said outer bearing having a tapped bore extending therethrough adapted to threadably receive a set screw therein;

an inner bearing including a frame and a rotatable inner ring which has an upper exposed end portion which extends from said frame of said inner bearing;

said frame of said inner bearing being secured to said lower plate of said first bearing bracket housing at said inner surface thereof so that said inner ring of said inner bearing is in alignment with said central opening in said lower plate of said first bearing bracket housing;

said upper exposed end portion of said inner ring of said inner bearing having a tapped bore extending therethrough adapted to threadably receive a set screw therein;

a first troughing side idler roller including a cylindrical body portion having upper and lower ends with a shaft secured thereto which extends therefrom;

said shaft having an outer end and an inner end;

said shaft having an annular groove formed therein adjacent said outer end thereof;

said shaft extending through said inner ring of said inner bearing and extending through said inner ring of said outer bearing;

a first set screw, having inner and outer ends, extending through said tapped bore in said lower exposed end portion of said inner ring of said outer bearing with said inner end thereof being received by said annular groove in said shaft; and a second set screw, having inner and outer ends, extending through said tapped bore in said upper exposed end portion of said inner ring of said inner bearing with said inner end of said second set screw frictionally engaging said shaft.

7. The structure of claim 6 wherein said inner and outer bearings are flange bearings.

8. The structure of claim 6 wherein said shaft has a tapped bore extending into said upper end thereof and wherein a fender washer is positioned on said upper end of said shaft and wherein a bolt extends through said fender washer into said tapped bore in said shaft, said fender washer having a diameter which is greater than the diameter of said inner ring of said upper bearing, said fender washer having a diameter which is less than the diameter of said central opening of said upper plate of said bearing bracket housing.

9. The structure of claim 6 wherein a cover is selectively removably secured to said bearing bracket housing.

10. The structure of claim 6 wherein a bearing bracket housing is secured to said side wall and wherein said bearing bracket housing is secured to said bearing bracket.

* * * * *